(12) United States Patent
Aoki et al.

(10) Patent No.: US 7,901,081 B2
(45) Date of Patent: Mar. 8, 2011

(54) METHOD OF MANUFACTURING OPTICAL COMPENSATION ELEMENT AND PROJECTOR

(75) Inventors: Kazuo Aoki, Chino (JP); Kazuhiro Nakazawa, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 369 days.

(21) Appl. No.: 12/164,649

(22) Filed: Jun. 30, 2008

(65) Prior Publication Data

US 2009/0015795 A1 Jan. 15, 2009

(30) Foreign Application Priority Data

Jul. 11, 2007 (JP) .................................. 2007-181795

(51) Int. Cl.
*G03B 21/14* (2006.01)
(52) U.S. Cl. ............................... 353/20; 349/96; 156/154
(58) Field of Classification Search .................... 353/20; 349/96; 359/497; 156/154
See application file for complete search history.

(56) References Cited

U.S. PATENT DOCUMENTS

| 2004/0239851 A1 | 12/2004 | Tsukagoshi et al. |
| 2005/0285999 A1 | 12/2005 | Kaise |
| 2006/0088998 A1 | 4/2006 | Moriya et al. |
| 2008/0192184 A1 * | 8/2008 | Tan et al. ..................... 349/96 |

FOREIGN PATENT DOCUMENTS

| JP | 11-002725 | 1/1999 |
| JP | 2003-131320 | 5/2003 |
| JP | 2004-317752 | 11/2004 |
| JP | 2005-049652 | 2/2005 |
| JP | 2006-276313 | 10/2006 |

* cited by examiner

*Primary Examiner* — Seung C Sohn
(74) *Attorney, Agent, or Firm* — AdvantEdge Law Group, LLC

(57) ABSTRACT

A projector with a specially manufactured optical compensation element is disclosed. One method of manufacturing the optical compensation element temporarily attaches an inorganic substrate made of a birefringent inorganic material to a base member with a temporary bond, grinds/polishes the inorganic substrate, attaches a light transmissive support substrate to a surface of the inorganic substrate on the opposite side to the side of the base member, and separates the inorganic substrate with the light transmissive support substrate from the base member.

19 Claims, 6 Drawing Sheets

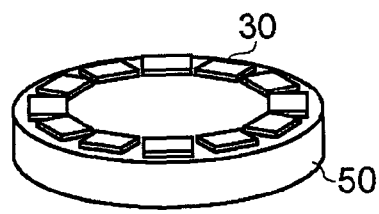
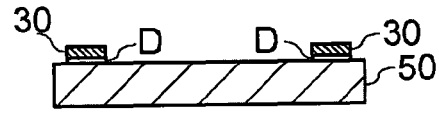
FIG. 4A  FIG. 4B
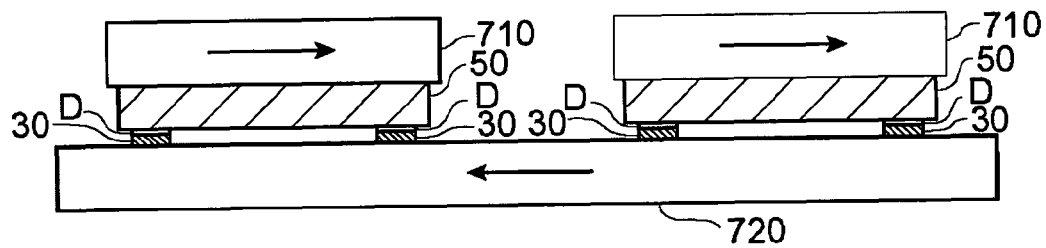
FIG. 4C
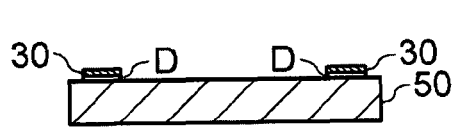
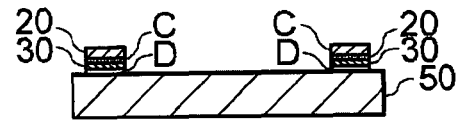
FIG. 4D  FIG. 4E
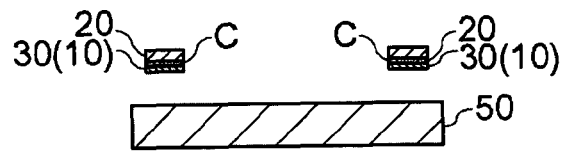
FIG. 4F

METHOD OF MANUFACTURING OPTICAL COMPENSATION ELEMENT AND PROJECTOR

CROSS REFERENCE TO RELATED APPLICATIONS

The present application claims priority under 35 U.S.C. §119 and incorporates by reference in its entirety Japanese Patent Application No. 2007-181795 filed Jul. 11, 2007.

BACKGROUND

Contrast of a projection image are improved in a projector having a liquid crystal light modulation device equipped with an optical compensation element as referred to in Japanese Patent Publication No. JP-A-2003-131320. According to the projector(s) in the related art, since the optical compensation element is provided, birefringence (an optical phase difference caused by liquid crystal molecules) caused by the pretilt angle of the liquid crystal panel may be compensated, and as a result, the contrast of the projection image may be improved.

As the optical compensation element, there are known inorganic material-based optical compensation elements besides organic material-based optical compensation elements (e.g., a stretched retardation film). The inorganic material-based optical compensation element has an inorganic birefringent optical compensation plate made, for example, of quartz or sapphire. Such an inorganic material-based optical compensation element has advantages of being superior in heat resistance, in heat radiating property, and in light stability, longer operating life, and good in-plane uniformity of refractive index anisotropy.

It should be noted that the inorganic optical compensation plate in the optical compensation element is thinned by grinding and polishing with, for example, a grinding/polishing device to be a thin sheet, and since such a thin inorganic optical compensation plate is difficult to treat by itself, the thin inorganic is used in the condition in which the thin inorganic optical compensation plate is bonded on a surface of a light transmissive support substrate with a predetermined thickness.

Incidentally, in the past, as a method of manufacturing the optical compensation element equipped with the inorganic optical compensation plate and the light transmissive support substrate, there has been a method of grinding and polishing an inorganic substrate made of a birefringent inorganic material temporarily attached to a grinding/polishing plate so as to have a predetermined thickness, then separating the inorganic substrate thus ground and polished from the grinding/polishing plate, and then bonding the inorganic substrate thus separated with the light transmissive support substrate with, for example, an adhesive.

However, in the manufacturing method of the optical compensation element in the related art, since the inorganic substrate thus ground and polished is extremely thin (e.g., no thicker than 10 µm), handling of the inorganic substrate thus ground and polished when separating it from the grinding/polishing plate or when bonding it with the light transmissive support substrate is not easy, and consequently, manufacturing the optical compensation element is not easy.

Further, during handling there is a high risk of damaging the inorganic substrate which is ground and polished according to the existing manufacturing method(s) of the optical compensation element in the related art, making a reduction of manufacturing cost difficult.

SUMMARY

Various embodiments described in the disclosure provide a method of manufacturing the optical compensation element that reduce the risk of damage to the inorganic substrate and thereby reduce associated manufacturing cost. Further embodiments provide a projector equipped with the optical compensation element manufactured by such a superior manufacturing method.

In at least one embodiment, there is provided a method of manufacturing an optical compensation element including the steps of (a) temporarily attaching an inorganic substrate made of a birefringent inorganic material to a base member with a temporary bond, (b) grinding/polishing the inorganic substrate mounting the base member, to which the inorganic substrate is temporary attached, on a grinding/polishing device, (c) attaching a light transmissive support substrate to a surface of the inorganic substrate thus ground/polished in step (b) on the opposite side to the side of the base member, and (d) separating the inorganic substrate temporarily attached to the base member from the base member together with the light transmissive support substrate, wherein the steps (a), (b), (c), and (d) are executed in this order.

Therefore, according to at least one disclosed method of manufacturing an optical compensation element, there is no need for handling the ground/polished inorganic substrate alone since the inorganic substrate may be ground and polished while temporarily attached to the base member, the ground/polished inorganic substrate may then be bonded with the light transmissive support substrate, and the inorganic substrate may be separated from the base member together with the light transmissive support substrate. As a result, the optical compensation element may be efficiently manufactured.

Further, according to at least one method of manufacturing an optical compensation element, since it is not required to handle the ground/polished inorganic substrate alone, the possibility of damaging the ground/polished inorganic substrate may be lowered, and as a result, reduction of manufacturing cost may be achieved.

In at least one method of manufacturing an optical compensation element according to this disclosure, it is preferable that the base member is a glass member having a surface finished like a frosted glass on a side to which the inorganic substrate is temporarily attached.

According to at least one embodiment, the inorganic substrate may be more easily separated from the base member when a temporary bond, such as a water-soluble temporary bond, is used, such that water may easily pervade the interface between the base member and the temporary bond. Further, since the contact area between the base member and the inorganic substrate increases, the adhesiveness between the base member and the inorganic substrate in the grinding/polishing process may be enhanced.

In at least one embodiment, a method of manufacturing an optical compensation element bonds the inorganic substrate and the light transmissive support substrate to each other with an adhesive in step (c).

According to various embodiments of the disclosure, the light transmission may improve by preventing the surface reflection in the interface between the inorganic substrate and the light transmissive support substrate.

Further, even in the case in which the inorganic substrate and the light transmissive support substrate are different in linear expansion coefficient, exfoliation in the lamination boundary between the substrates becomes difficult to occur, thus deterioration of long-term reliability may be prevented.

In a method of manufacturing an optical compensation element according to at least one embodiment of the disclosure, the light transmissive support substrate is attached to the inorganic substrate in step (c), and exhibits a larger outer size than the outer size of the inorganic substrate.

In one embodiment, even if the adhesive flows off between the inorganic substrate and the light transmissive support substrate when bonding the inorganic substrate and the light transmissive support substrate with each other, the adhesive may be prevented from entering between the inorganic substrate and the base member or from being attached to the base member. In this manner, the separation of the inorganic substrate from the base member is prevented from becoming difficult.

In at least one embodiment, a method of manufacturing an optical compensation element directly bonds the inorganic substrate and the light transmissive support substrate with each other.

According to at least one embodiment, surface reflection may be prevented in the interface between the inorganic substrate and the light transmissive support substrate, thus the light transmission may be improved. Further, the inorganic substrate and the light transmissive support substrate may solidly be bonded with each other. Further, since variation in thickness of the adhesive, which may occur in the case of using the adhesive, does not occur, the in-plane thickness variation of the inorganic substrate thus ground/polished may be reduced.

In at least one embodiment a method of manufacturing an optical compensation element according to the disclosure, terminates the grinding/polishing of the inorganic substrate, such as previously disclosed in step (b), in a stage of one of grinding and rough polishing.

In a method of manufacturing an optical compensation element according to at least one embodiment, the ground/polished surface of the inorganic substrate forms the lamination boundary when laminating the inorganic substrate and the light transmissive support substrate with each other, such that the optical performance is not degraded much, even in the case in which the grinding/polishing of the inorganic substrate is terminated in the stage of grinding or rough polishing without performing mirror polishing. In other words, according to at least one method of manufacturing an optical compensation element, time required for the grinding/polishing process may be reduced without significantly degrading the optical performance.

Further, by executing mirror polishing on the inorganic substrate, the thickness in the peripheral portion of the inorganic substrate may become smaller than the thickness in the center portion thereof in some cases depending on the shape of the polishing pad. In these cases, since the in-plane thickness variation is caused in the inorganic substrate, the optical performance of the optical compensation element is problematically lowered.

In contrast, according to at least one method of manufacturing an optical compensation element according to various embodiments described in the disclosure, since the grinding/polishing of the inorganic substrate is terminated in the stage of grinding or rough polishing without performing mirror polishing, in-plane thickness variation of the inorganic substrate and degradation in the optical performance of the optical compensation element caused by the mirror polishing may effectively be eliminated.

In at least one method of manufacturing an optical compensation element according to various embodiments described in the disclosure, a quartz substrate or a sapphire substrate is used as the inorganic substrate.

Therefore, according to at least one method of manufacturing an optical compensation element related to various embodiments described in the disclosure, the optical compensation element equipped with the inorganic optical compensation plate made of quartz or sapphire may more easily be manufactured at a lower cost than existing manufacturing methods.

A projector, according to various embodiments described in the disclosure, includes an optical compensation element manufactured according to at least one previously described method of manufacturing.

Therefore, the projector according to at least one embodiment provides a relatively low manufacturing cost projector capable of improving the contrast of a projection image.

BRIEF DESCRIPTION OF THE DRAWINGS

Various embodiments are described with reference to the accompanying drawings, wherein like reference numbers designate like elements.

FIGS. 4A through 4F are diagrams showing a method of manufacturing an optical compensation element according to various embodiments of the present disclosure.

DETAILED DESCRIPTION OF EXEMPLARY EMBODIMENTS

In the following detailed description, reference is made to the accompanying drawings which form a part hereof wherein like numerals designate like parts throughout, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. Reference in the specification to "one embodiment" or "an embodiment" means that a particular feature, structure, or characteristic described in connection with the embodiment is included in at least one embodiment of the disclosure. The meaning of "in" may include "in" and "on." The appearances of the phrases "in one embodiment" or "in an embodiment" in various places in the specification do not necessarily all refer to the same embodiment, but it may.

Hereinafter, at least one method of manufacturing an optical compensation element and a projector will be explained based on some embodiments shown in the accompanying drawings.

First, a configuration of the projector 1000 according to one embodiment will be explained with reference to FIGS. 1A and 1B.

Figures 1A, 1B:
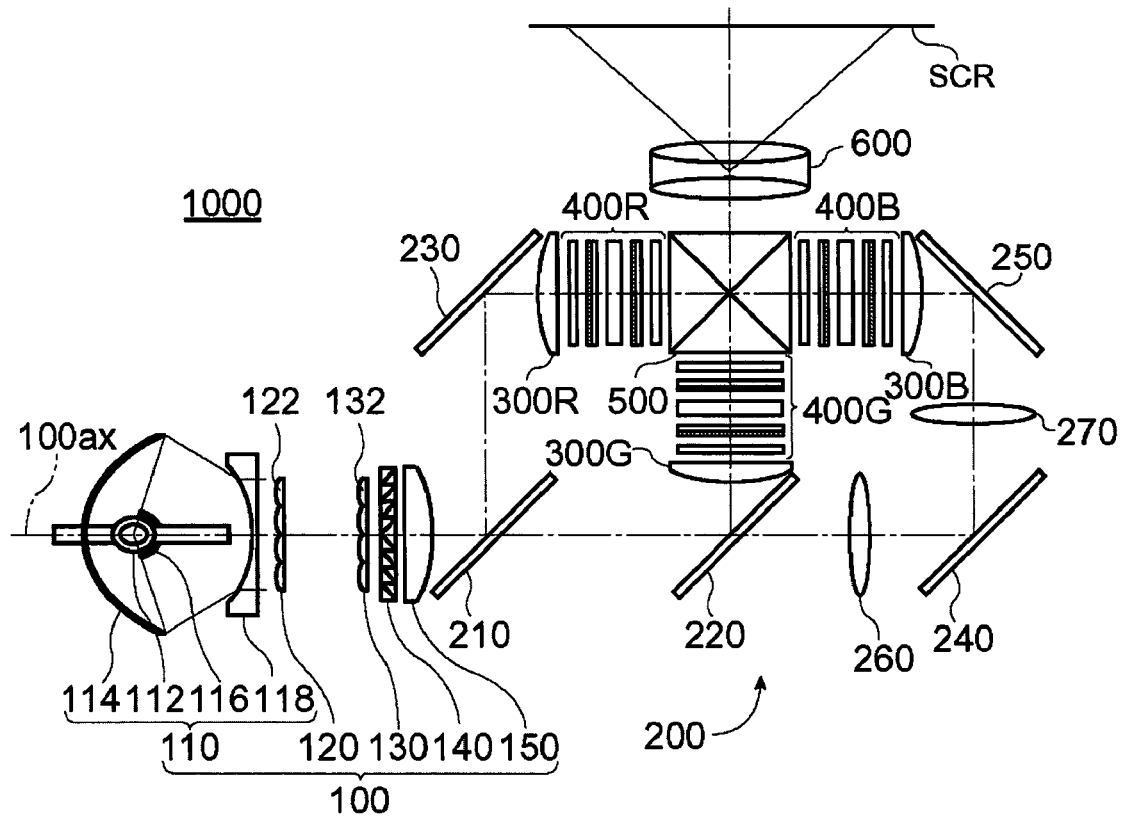
FIGS. 1A and 1B are diagrams showing a projector 1000 according to various embodiments of the present disclosure.

FIGS. 1A and 1B are diagrams showing a projector 1000 according to one embodiment. FIG. 1A is a diagram showing an optical system of the projector 1000, and FIG. 1B is a diagram showing a substantial part of the projector 1000.

As shown in FIGS. 1A and 1B, the projector 1000 according to one embodiment is a projector provided with a lighting device 100, a color separation/light guiding optical system 200 for separating the lighting beam from the lighting device 100 into three colored light beams of a red light beam, a green light beam, and a blue light beam and guiding them to an area to be illuminated, three liquid crystal light modulation devices 400R, 400G, and 400B for respectively modulating the three colored light beams, which are separated into by the color separation/light guiding system 200, in accordance with image information, a cross dichroic prism 500 for combining the colored light beams thus modulated by the three liquid crystal light modulation devices 400R, 400G, and 400B, and a projection optical system 600 for projecting the light beam thus combined by the cross dichroic prism 500 onto a projection surface such as a screen SCR.

The lighting device 100 has a light source device 110 for emitting a lighting beam towards the area to be illuminated, a first lens array 120 having a plurality of first small lenses 122 for dividing the lighting beam emitted from the light source device 110 into a plurality of partial beams, a second lens array 130 having a plurality of second small lenses 132 corresponding to the plurality of first small lenses 122 of the first lens array 120, a polarization conversion element 140 for converting each of the partial beams from the second lens array 130 into a substantially unique linearly-polarized light beam having a uniform polarization direction and emitting the resulted light beams, and an overlapping lens 150 for overlapping the partial beams emitted from the polarization conversion element 140 with each other in the area to be illuminated.

The light source device 110 has an ellipsoidal reflector 114, a light emitting tube 112 having the emission center in the vicinity of the first focal point of the ellipsoidal reflector 114, a secondary mirror 116 for reflecting light emitted from the light emitting tube 112 towards the area to be illuminated, towards the light emitting tube 112, and a concave lens 118 for substantially collimating the converging light from the ellipsoidal reflector 114 to emit it as a substantially collimated light. The light source device 110 emits the light beam having the lighting beam axis 100$ax$ as the center axis.

The light emitting tube 112 may include a lamp section and a pair of sealing sections extending on both sides of the lamp section. The lamp section may be made of quartz glass and formed to have a spherical shape, and may include a pair of electrodes disposed inside the lamp section, mercury, a rare gas, and a small amount of halogen encapsulated inside the lamp section. As the light emitting tube 112, various light emitting tubes may be adopted, and specifically, a metal halide lamp, a high pressure mercury lamp, a super high pressure mercury lamp, and so on may be adopted.

The ellipsoidal reflector 114 has a neck-like section having a tube-like shape in which one of the sealing sections of the light emitting tube 112 is inserted and fixed thereto, and a reflecting concave surface for reflecting the light emitted from the light emitting tube 112 towards the second focal position.

The secondary mirror 116 is a reflecting section for covering about a half of the lamp section of the light emitting tube 112, and disposed so as to be opposed to the reflecting concave surface of the ellipsoidal reflector 114. The other of the sealing sections of the light emitting tube 112 is inserted in and fixed to the secondary mirror 116. The secondary mirror 116 returns the light, which is emitted from the light emitting tube 112 and proceeding in other directions than the directions towards the ellipsoidal reflector 114, to the light emitting tube 112 so as to enter the ellipsoidal reflector 114.

The concave lens 118 is disposed on the side of the area to be illuminated from the ellipsoidal reflector 114. The concave lens 118 is configured so as to emit the light from the ellipsoidal reflector 114 towards the first lens array 120.

The first lens array 120 has a function of a beam splitting optical element for splitting the light beam from the concave lens 118 into partial light beams, and has a configuration of arranging the plurality of first small lenses 122 in a plane perpendicular to the lighting beam axis 100$ax$ in a matrix with two or more rows and two or more columns. Although an explanation with reference to a drawing will be omitted, an outer shape of the first small lens 122 is similar with respect to an outer shape of the image forming areas of the liquid crystal panel 410R, 410G, and 410B described later.

The second lens array 130 has a function of imaging the image of each of the first small lenses 122 in the first lens array 120 in the vicinity of the image forming areas of the liquid crystal panels 410R, 410G, and 410B in cooperation with the overlapping lens 150. The second lens array 130 has substantially the same configuration as the first lens array 120, namely the configuration of arranging the plurality of second small lenses 132 in a plane perpendicular to the lighting beam axis 100$ax$ in a matrix with two or more rows and two or more columns.

The polarization conversion element 140 is a polarization conversion element for converting the polarization direction of each of the partial beams split into by the first lens array 120 to emit each of the partial light beams as a substantially unique linearly-polarized light beam having a uniform polarization direction.

The polarization conversion element 140 is provided with a polarization splitting layer for transmitting a part of the light beam from the light source device 110 having one polarization component (e.g., P-polarization component) and reflecting the other part of the light beam having the other polarization component (e.g., S-polarization component) in a direction perpendicular to the lighting beam axis 100$ax$, a reflecting layer for reflecting the light beam having the other polarization component reflected by the polarization splitting layer in the direction parallel to the lighting beam axis 100$ax$, and a retardation plate for converting the light beam having the one polarization component transmitted through the polarization splitting layer into a light beam having the other polarization component.

The overlapping lens 150 is an optical element for collecting the plurality of partial light beams passing through the first lens array 120, the second lens array 130, and the polarization conversion element 140 to overlap them in the vicinity of the image forming areas of the liquid crystal panel 410R, 410G, and 410B. The overlapping lens 150 is disposed so that the optical axis of the overlapping lens 150 and the lighting beam axis 100ax of the lighting device 100 become substantially identical to each other. It should be noted that the overlapping lens 150 may be configured with a compound lens having a plurality of lenses combined with each other.

The color separation/light guiding optical system 200 includes dichroic mirrors 210, 220, reflecting mirrors 230, 240, 250, an entrance side lens 260, and a relay lens 270. The color separation/light guiding optical system 200 has a function of separating the lighting beam emitted from the overlapping lens 150 into three colored light beams, namely the red light beam, the green light beam, and the blue light beam, and respectively guiding the colored light beams to the three liquid crystal light modulation devices 400R, 400G, 400B to be objects of illumination.

The dichroic mirrors 210, 220 are optical elements each having a wavelength selecting film, which reflects a light beam in a predetermined wavelength band and transmits a light beam in another wavelength band, formed on a substrate. The dichroic mirror 210 disposed in an anterior stage of the light path is a mirror for reflecting the red light component and transmitting the other colored light component. The dichroic mirror 220 disposed in a posterior stage of the light path is a mirror for reflecting the green light component and transmitting the blue light component.

The red light component reflected by the dichroic mirror 210 is deflected by the reflecting mirror 230, and enters the liquid crystal light modulation device 400R for the red light beam via a condenser lens 300R. The condenser lens 300R is provided for converting each of the partial light beams from the overlapping lens 150 into a light beam substantially parallel with respect to each of the principal rays. It should be noted that other condenser lenses 300G, 300B are similarly configured to the condenser lens 300R.

The green light component out of the green light component and the blue light component transmitted through the dichroic mirror 210 is reflected by the dichroic mirror 220, and enters the liquid crystal light modulation device 400G for green light beam via the condenser lens 300G. On the other hand, the blue light component is transmitted through the dichroic mirror 220, and enters the liquid crystal light modulation device 400B for the blue light via the entrance side lens 260, an entrance side reflecting mirror 240, the relay lens 270, an exit side reflecting mirror 250, and the condenser lens 300B. The entrance side lens 260, the relay lens 270, and the reflecting mirrors 240, 250 have a function of guiding the blue light component thus transmitted through the dichroic mirror 220 to the liquid crystal light modulation device 400B.

The liquid crystal light modulation devices 400R, 400G, and 400B are for modulating the respective lighting beams in accordance with the image information, and form an object to be illuminated by the lighting device 100.

The liquid crystal light modulation device 400R, 400G, 400B are provided with liquid crystal panels 410R, 410G, 410B, entrance side polarization plates 420R, 420G, 420B disposed on the light-entrance side of the liquid crystal panels 410R, 410G, 410B, exit side polarization plates 430R, 430G, 430B disposed on the light-exit side of the liquid crystal panels 410R, 410G, 410B, optical compensation elements 440R, 440G, 440B disposed between the entrance side polarization plates 420R, 420G, 420B and the liquid crystal panels 410R, 410G, 410B, and optical compensation elements 450R, 450G, 450B disposed between the liquid crystal panels 410R, 410G, 410B and the exit side polarization plates 430R, 430G, 430B, respectively.

The liquid crystal panels 410R, 410G, 410B, although omitted from the explanation with reference to the drawing here, are each composed of a pair of light transmissive glass substrates (an opposed substrate and a TFT substrate) encapsulating a liquid crystal material as an electro-optic substance, and are TN-type liquid crystal panels. For example, polysilicon TFT are used as switching elements, the polarization direction of the unique linearly-polarized light beam emitted from each of the entrance side polarization plates 420R, 420G, 420B is modulated in accordance with the image information thus provided. Further, the liquid crystal panels 410R, 410G, 410B are each provided with a dust-proof glass member (not shown) on each of the light-entrance and light-exit sides.

The light modulation of the incident colored light beams are performed by the entrance side polarization plates 420R, 420G, 420B, the liquid crystal panels 410R, 410G, 410B, and the exit side polarization plates 430R, 430G, 430B, respectively.

The optical compensation elements 440R, 440G, 440B, 450R, 450G, 450B are elements for compensating the birefringence (an optical phase difference caused by liquid crystal molecules) caused by the pretilt angle of the liquid crystal panels 410R, 410G, 410B, respectively, although a detailed explanation therefore is omitted here, each of them has an inorganic optical compensation plate made of a birefringent inorganic material and a light transmissive support substrate for supporting the inorganic optical compensation plate. The inorganic optical compensation plate is an inorganic optical compensation plate made, for example, of quartz, and the light transmissive support substrate is a light transmissive support substrate made, for example, of quartz glass.

It should be noted that the manufacturing method of the optical compensation elements 440R, 440G, 440B, 450R, 450G, 450B will be described later in detail.

The cross dichroic prism 500 is an optical element for combining optical images modulated for respective colored light beams emitted from the respective exit side polarization plates 430R, 430G, 430B to form a color image. The cross dichroic prism 500 has a substantially rectangular planar shape formed of four rectangular prisms bonded with each other, and on the substantially X-shaped interfaces on which the rectangular prisms are bonded with each other, there are formed dielectric multilayer films. The dielectric multilayer film formed on one of the substantially X-shaped interfaces is for reflecting the blue light beam, and the dielectric multilayer film formed on the other of the interfaces is for reflecting the red light beam. The blue light beam and the red light beam are deflected by these dielectric multilayer films to have the proceeding direction aligned with the proceeding direction of the green light, thus the three colored light beams are combined.

The color image emitted from the cross dichroic prism 500 is enlargedly projected by the projection optical system 600 to form a large screen image on the screen SCR.

Then, a manufacturing method (a method of manufacturing the optical compensation element according to one embodiment) for manufacturing the optical compensation elements 440R, 440G, 440B, 450R, 450G, 450B will be explained with reference to FIGS. 2, 3, and 4A through 4F. It should be noted that the optical compensation elements 440R, 440G, 440B, 450R, 450G, 450B have the same configuration as an optical compensation element 1 in the following explanation, and are manufactured by the same manufacturing method as in the case with the optical compensation element 1.

Figure 2:
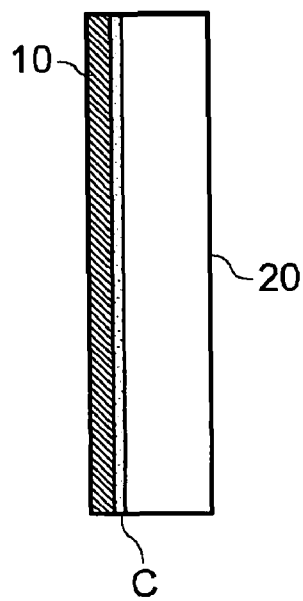
FIG. 2 is a diagram showing an optical compensation element.

FIG. 2 is a diagram showing a configuration of an optical compensation element 1.

Figure 3:
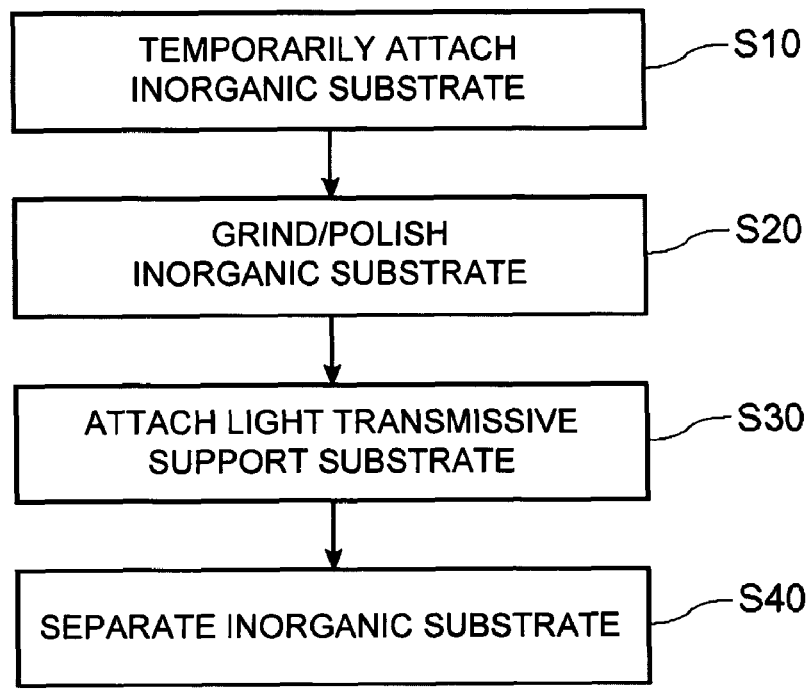
FIG. 3 is a flowchart showing a method of manufacturing an optical compensation element according to various embodiments of the present disclosure.

FIG. 3 is a flowchart showing the method of manufacturing an optical compensation element according to one embodiment.

FIGS. 4A through 4F are diagrams showing a method of manufacturing an optical compensation element according to one embodiment for the purpose of an explanation thereof. FIGS. 4A through 4F are diagrams schematically showing respective steps, wherein FIG. 4A is a perspective view showing the condition in which an inorganic substrate 30 is temporarily attached to a base member 50, FIG. 4B is a cross-sectional view showing the condition in which an inorganic substrate 30 is temporarily attached to a base member 50, FIG. 4C is a diagram showing the condition in which a grinding/polishing process is being executed on the inorganic substrate 30, FIG. 4D is a diagram showing the inorganic substrate 30 thus ground and polished and the base member 50, FIG. 4E is a diagram showing the step of temporarily attaching the light transmissive support substrate, and FIG. 4F is a diagram showing the separation step.

It should be noted that in FIGS. 2 and 4A through 4F, the thickness and the size of each of the components (e.g., the inorganic optical compensation plates 10, the light transmissive support substrates 20, and the inorganic substrates 30) are shown in an exaggerated manner for the sake of simplification of the explanations.

As shown in FIG. 2, the manufacturing method of an optical compensation element according to one embodiment is a manufacturing method for manufacturing the optical compensation element 1 provided with the inorganic optical compensation plate 10 and the light transmissive support substrate 20 for supporting the inorganic optical compensation plate 10.

Various operations will be described in relation to FIG. 3 as multiple discrete steps in turn, in a manner that is most helpful in understanding the various embodiments of the manufacturing process; however, the order of description should not necessarily be construed so as to imply that these operations are necessarily order dependent. In particular, these operations need not be performed in the order of presentation, but they may. Moreover, at least one embodiment identifies a preferred performance order of the discrete steps that corresponds to the order of presentation.

In one embodiment, the discrete steps include: "TEMPORARILY ATTACH INORGANIC SUBSTRATE," "GRIND/POLISH INORGANIC SUBSTRATE," "ATTACH LIGHT TRANSMISSIVE SUPPORT SUBSTRATE," and "SEPARATE INORGANIC SUBSTRATE" which are sequentially executed as shown in the portion of one embodiment illustrated in FIG. 3. Hereinafter, each of these discrete steps will sequentially be explained under corresponding section headings below. Section headings are merely employed to improve readability, and they are not to be construed to restrict or narrow the present invention. For example, the order of description headings should not necessarily be construed so as to imply that these operations are necessarily order dependent.

1. Step of Temporarily Attaching Inorganic Substrate

Firstly, as shown in FIGS. 4A and 4B, the inorganic substrate 30 made of an inorganic material having a birefringent property is temporarily attached to the base member 50 with a temporary bond D (step S10 in FIG. 3). On this occasion, by temporarily attaching a plurality of inorganic substrates 30 to the base member 50, a plurality of optical compensation elements 1 may simultaneously be obtained after the entire steps are completed.

As the inorganic substrate 30, a quartz substrate, for example, is used. The thickness of the inorganic substrate 30 is, for example, 500 μm before the grinding/polishing process has not yet executed thereon. As the temporary bond D, a water-soluble temporary bond (K40, a product of ADELL Corporation) is used, for example. As the base member 50, a soda-lime glass plate with a predetermined thickness (e.g., 30 mm) is used. It should be noted here that although an explanation with reference to a drawing is omitted here, the surface of the base member 50 on which the inorganic substrate 30 is to be temporarily attached is finished like a frosted glass.

2. Step of Grinding/Polishing the Inorganic Substrate

Then, as shown in FIG. 4C, the base member 50 with the inorganic substrate 30 temporarily attached thereto is mounted on a grinding/polishing device (not shown), and the inorganic substrate 30 is ground and polished so as to have a predetermined thickness (e.g., 7 μm) (step S20 in FIG. 3).

The grinding/polishing device is a device for grinding and polishing the inorganic substrate 30, and is provided with rotation sections 710 each for rotating the base member 50 in a predetermined direction, and a revolution section 720 configured to rotate in a reverse direction of the rotational direction of the rotation sections 710. On the revolution section 720, there is disposed a plurality of rotation sections 710, and it is arranged that each of the rotation sections 710 and the revolution section 720 just have a relationship between rotation and revolution. On the revolution section 720, there is disposed a grinding pad or a polishing pad in accordance with the purpose.

In the step of grinding/polishing the inorganic substrate, it is arranged that the grinding/polishing of the inorganic substrate 30 is terminated in the stage of grinding or rough polishing without performing mirror polishing.

After finishing the step of grinding/polishing the inorganic substrate, it is preferable that the ground/polished surface of the inorganic substrate 30 is wiped or cleansed with alcohol.

3. Step of Attaching the Light Transmissive Support Substrate

Subsequently, as shown in FIG. 4E, the light transmissive support substrate 20 is attached to the surface of the ground/polished inorganic substrate 30 on the side opposite to the base member 50 with an adhesive C (step S30 in FIG. 3).

As the light transmissive support substrate 20, a quartz glass substrate, for example, is used. The thickness of the light transmissive support substrate 20 is, for example, 500 μm. As the adhesive C, an ultraviolet curing adhesive is used. It should be noted that as a method of curing the adhesive, it is preferable to temporarily cure the adhesive under a fluorescent light, and then fully cure the adhesive in a UV belt oven. By thus using the temporary curing, it becomes possible to promote the chain reaction to increase the molecular weight of the resin, thus promoting the adhesive force.

4. Separation Step

Subsequently, as shown in FIG. 4F, the inorganic substrate 30 (i.e., the inorganic optical compensation plate 10) temporarily attached to the base member 50 is separated from the base member 50 together with the light transmissive support substrate 20 (step S40 in FIG. 3). Specifically, the inorganic substrate 30 (the inorganic optical compensation plate 10) and the light transmissive support substrate 20 are put into a warm-water bath with a function of applying an ultrasonic wave together with the base member 50, thereby separating the inorganic substrate 30 (the inorganic optical compensation plate 10) and the light transmissive support substrate 20 from the base member 50. The temperature of the warm-water bath and the process time in the warm-bath may appropriately be adjusted in accordance with the type of the temporary bond D and so on.

By executing the steps described above, the optical compensation element 1 (the optical compensation elements 440R, 440G, 440B, 450R, 450G, 450B) shown in FIG. 2 may be manufactured.

As described above, according to the method of manufacturing an optical compensation element related to one embodiment, since the inorganic substrate 30 has once been ground and polished in the condition in which the inorganic substrate 30 is temporarily attached to the base member 50, then the ground/polished inorganic substrate 30 and the light transmissive support substrate 20 are bonded with each other, and the inorganic substrate 30 is separated from the base member 50 together with the light transmissive support substrate 20, there is no need for handling the ground/polished inorganic substrate 30 alone. As a result, the optical compensation element may easily be manufactured than before.

Further, according to the method of manufacturing an optical compensation element related to one embodiment, since it is not required to handle the ground/polished inorganic substrate 30 alone, the possibility of damaging the ground/polished inorganic substrate 30 may be lowered, and as a result, reduction of manufacturing cost may be achieved.

Further, according to the method of manufacturing an optical compensation element related to one embodiment, prior to executing the step of attaching the light transmissive support substrate, presence or absence of a grinding fault and so on in the ground/polished inorganic substrate 30 may be confirmed. Thus, even if the grinding fault and so on has been caused in the ground/polished inorganic substrate 30, the fault may be prevented from directly causing the fault as an optical compensation element, and consequently, reduction of manufacturing cost is not so much disturbed.

In the method of manufacturing an optical compensation element according to one embodiment, since the base member 50 is a glass material having the surface processed like a frosted glass on the side to which the inorganic substrate 30 is temporarily attached, water may easily pervade the interface between the base member 50 and the temporary bond D, and consequently, it becomes easy to separate the inorganic substrate 30 from the base member 50. Further, since the contact area between the base member 50 and the inorganic substrate 30 increases, the adhesiveness between the base member 50 and the inorganic substrate 30 in the grinding/polishing process may be enhanced.

In the method of manufacturing an optical compensation element according to one embodiment, since the inorganic substrate 30 and the light transmissive support substrate 20 are bonded with each other with the adhesive C in the step of attaching the light transmissive support substrate, the surface reflection in the interface between the inorganic substrate 30 and the light transmissive support substrate 20 may be prevented from generating, thus the light transmission may be improved.

Further, even in the case in which the inorganic substrate 30 and the light transmissive support substrate 20 are different in linear expansion coefficient, exfoliation in the lamination boundary between the substrates becomes difficult to occur, thus deterioration of long-term reliability may be prevented.

In the method of manufacturing an optical compensation element according to one embodiment, it is arranged that the grinding/polishing of the inorganic substrate 30 is terminated in the stage of grinding or rough polishing in the step of grinding/polishing the inorganic substrate.

In the method of manufacturing an optical compensation element according to one embodiment, since the ground/polished surface of the inorganic substrate 30 forms the lamination boundary when laminating the inorganic substrate 30 and the light transmissive support substrate 20 with each other, the optical performance is not so much degraded even in the case in which the grinding/polishing of the inorganic substrate 30 is terminated in the stage of grinding or rough polishing without performing mirror polishing. In other words, according to the method of manufacturing an optical compensation element related to one embodiment, time required for the grinding/polishing process may be reduced without so much degrading the optical performance.

Further, according to the method of manufacturing an optical compensation element according to one embodiment, since the grinding/polishing of the inorganic substrate 30 is terminated in the stage of grinding or rough polishing without performing mirror polishing in the step of grinding/polishing the inorganic substrate, in-plane thickness variation of the inorganic substrate 30 and degradation in the optical performance of the optical compensation element caused by the mirror polishing may be eliminated.

In the method of manufacturing an optical compensation element according to one embodiment, since the quartz substrate is used as the inorganic substrate 30, the optical compensation element 1 equipped with the inorganic optical compensation plate 10 made of quartz may more easily be manufactured at a lower price than before.

In the method of manufacturing an optical compensation element according to one embodiment, the quartz glass substrate is used as the light transmissive support substrate 20. Since the quartz glass substrate has little birefringence, degradation in the quality of the light beam transmitted through the light transmissive support substrate 20 may be prevented, thus the high quality optical compensation element may be manufactured.

The projector 1000 according to one embodiment is provided with the optical compensation elements 440R, 440G, 440B, 450R, 450G, 450B manufactured by the manufacturing method of an optical compensation element according to one embodiment, and consequently becomes a projector lower in price than before and capable of improving the contrast of the projection image.

Figure 5A:
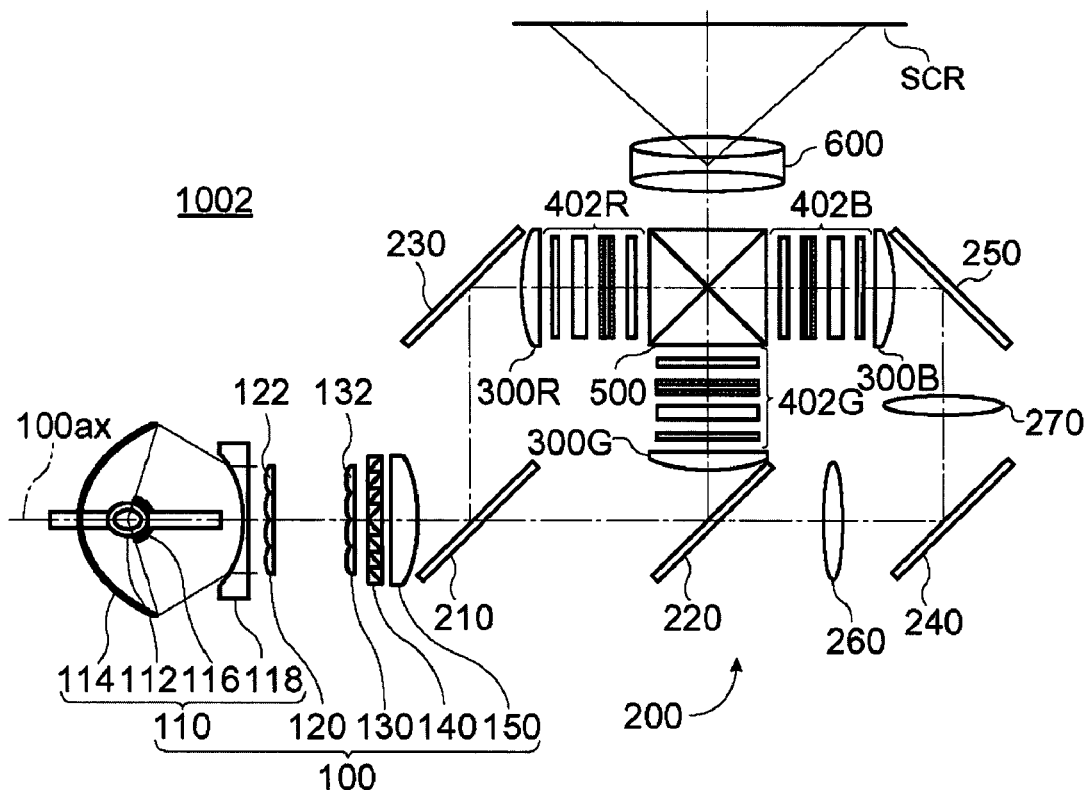
FIGS. 5A and 5B are diagrams showing a projector according to various embodiments of the present disclosure.
Figure 5B:
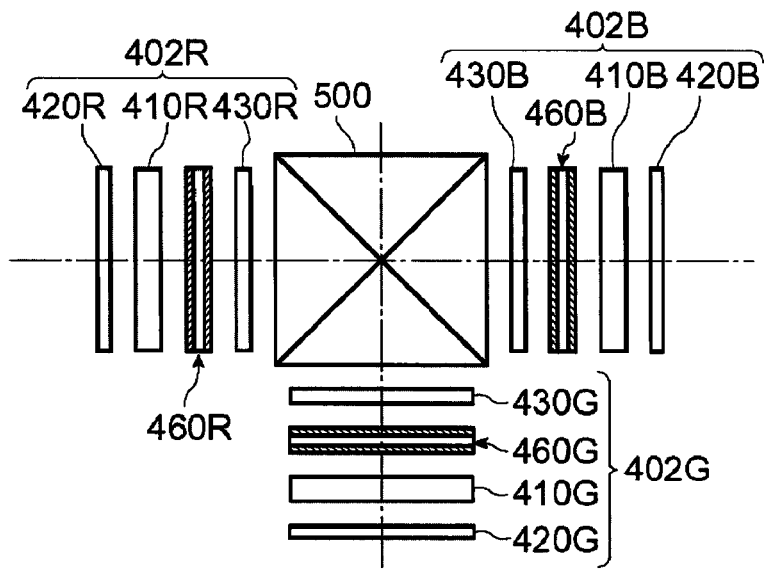

FIGS. 5A and 5B are diagrams showing a projector 1002 according to one embodiment for the purpose of an explanation thereof. FIG. 5A is a diagram showing an optical system of the projector 1002, and FIG. 5B is a diagram showing a substantial part of the projector 1002.

It should be noted that in FIGS. 5A and 5B, the same members as shown in FIGS. 1A and 1B are denoted with the same reference numerals and detailed explanations therefore will be omitted.

The projector 1002 according to one embodiment basically has a similar configuration to the configuration of the projector 1000 according to at least one previously described embodiment, but is different from the projector 1000 according to at least one previously described embodiment in the configuration of the optical compensation element.

Specifically, in contrast to the fact that the projector 1000 according to at least one previously described embodiment is provided with the optical compensation elements 440R, 440G, 440B, 450R, 450G, 450B disposed respectively on the light-entrance side and the light-exit side of the liquid crystal panels 410R, 410G, 410B, the projector 1002 according to one embodiment is provided with the optical compensation elements 460R, 460G, 460B disposed only on the light-exit side thereof.

The optical compensation elements 460R, 460G, 460B are elements for compensating the birefringence (an optical phase difference caused by liquid crystal molecules) caused by the pretilt angle of the liquid crystal panels 410R, 410G,

410B, respectively, although a detailed explanation therefore is omitted here, each of them has two inorganic optical compensation plates made of a birefringent inorganic material and a light transmissive support substrate for supporting the two inorganic optical compensation plates. The two inorganic optical compensation plates are each an inorganic optical compensation plate made, for example, of quartz, and the light transmissive support substrate is a light transmissive support substrate made, for example, of quartz glass.

The method (a method of manufacturing an optical compensation element according to at least one of the previously described embodiments) of manufacturing the optical compensation elements 460R, 460G, 460B will be explained with reference to FIGS. 6, 7, and 8A through 8H. It should be noted that the optical compensation elements 460R, 460G, 460B have the same configuration as the optical compensation element 2 manufactured by the method of manufacturing an optical compensation element according to the embodiment described below, and are manufactured by the same manufacturing method.

Figure 6:
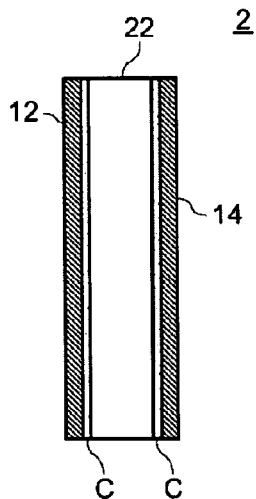
FIG. 6 is a diagram showing a configuration of an optical compensation element.

FIG. 6 is a diagram showing a configuration of an optical compensation element 2.

Figure 7:
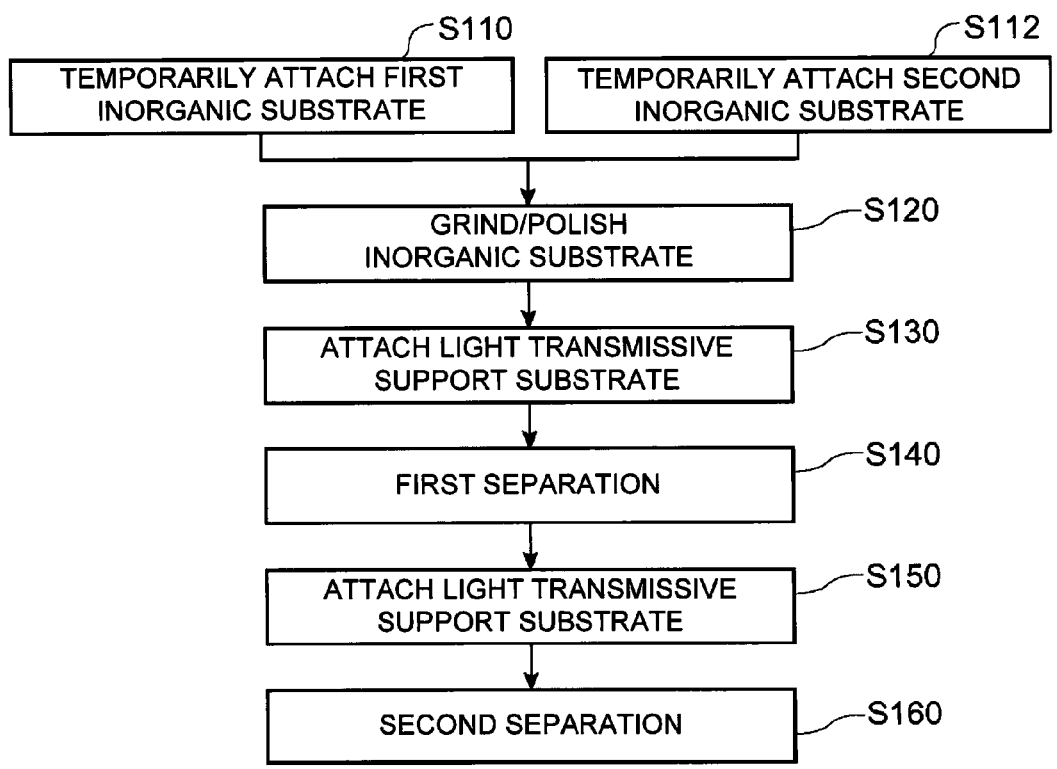
FIG. 7 is a flowchart showing a method of manufacturing an optical compensation element according to various embodiments of the present disclosure.

FIG. 7 is a flowchart showing the method of manufacturing an optical compensation element according to one embodiment. Various operations will be described in relation to FIG. 7 as multiple discrete steps in turn, in a manner that is most helpful in understanding the various embodiments of the manufacturing process; however, the order of description should not necessarily be construed so as to imply that these operations are necessarily order dependent. In particular, these operations need not be performed in the order of presentation, but they may. Moreover, at least one embodiment identifies a preferred performance order of the discrete steps that corresponds to the order of presentation.

Figure 8A:
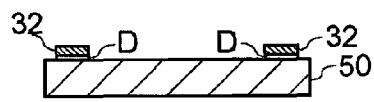
FIGS. 8A through 8H are diagrams showing a method of manufacturing an optical compensation element according to various embodiments of the present disclosure.
Figure 8B:
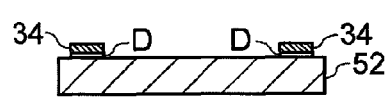
Figure 8C:
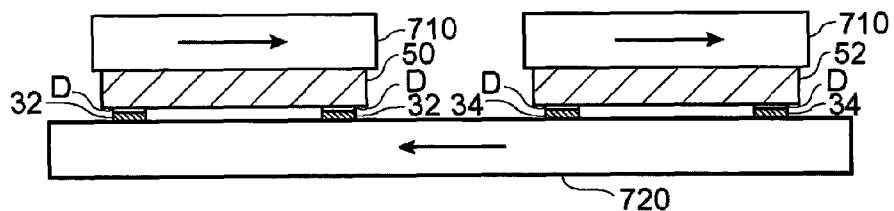
Figure 8D:
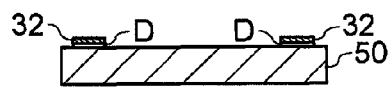
Figure 8E:
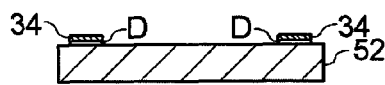
Figure 8E:
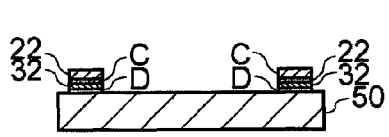
Figure 8F:
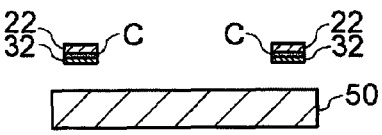
Figure 8G:
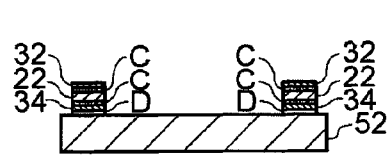
Figure 8H:
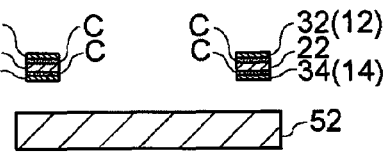

FIGS. 8A through 8H are diagrams showing a method of manufacturing an optical compensation element according to one embodiment for the purpose of an explanation thereof. FIGS. 8A through 8F are diagrams schematically showing respective steps, wherein FIG. 8A is a cross-sectional view showing the condition in which an inorganic substrate 32 is temporarily attached to a base member 50, FIG. 8B is a cross-sectional view showing the condition in which an inorganic substrate 34 is temporarily attached to a base member 52, FIG. 8C is a diagram showing the condition in which a grinding/polishing process is being executed on the inorganic substrates 32, 34, FIG. 8D is a diagram showing the inorganic substrates 32, 34 thus ground and polished and the base members 50, 52, FIG. 8E is a diagram showing the first step of temporarily attaching the light transmissive support substrate, FIG. 8F is a diagram showing the first separation step, FIG. 8G is a diagram showing the second step of temporarily attaching the light transmissive support substrate, and FIG. 8H is a diagram showing the second separation step.

It should be noted that in FIGS. 6 and 8A through 8H, the thickness and the size of each of the components (e.g., the inorganic optical compensation plates 12, 14, the light transmissive support substrates 22, and the inorganic substrates 32, 34) are shown in an exaggerated manner for the sake of simplification of the explanations.

In contrast to the fact that the method of manufacturing an optical compensation element according to one embodiment is, as shown in FIG. 2, the manufacturing method for manufacturing the optical compensation element 1 having the inorganic optical compensation plate 10 disposed on either one side of the light transmissive support substrate 20, the method of manufacturing an optical compensation element according to another embodiment is, as shown in FIG. 6, a manufacturing method for manufacturing the optical compensation element 2 having the inorganic optical compensation plates 12, 14 respectively disposed on both sides of the light transmissive support substrate 22.

As shown in FIG. 7, the discrete steps associated with a method of manufacturing an optical compensation element according to at least one embodiment includes "TEMPORARILY ATTACH FIRST INORGANIC SUBSTRATE," "TEMPORARILY ATTACH SECOND INORGANIC SUBSTRATE," "GRIND/POLISH INORGANIC SUBSTRATE," "ATTACH FIRST LIGHT TRANSMISSIVE SUPPORT SUBSTRATE," "FIRST SEPARATION," "ATTACH SECOND LIGHT TRANSMISSIVE SUPPORT SUBSTRATE," and "SECOND SEPARATION." Hereinafter, each of these steps will sequentially be explained under corresponding section headings below. As previously indicated, section headings are merely employed to improve readability, and they are not to be construed to restrict or narrow the present invention. For example, the order of description headings should not necessarily be construed so as to imply that these operations are necessarily order dependent.

1. First Step of Temporarily Attaching Inorganic Substrate

First, as shown in FIG. 8A, the inorganic substrate 32 made of an inorganic material having a birefringent property is temporarily attached to the base member 50 with a temporary bond D (step S110 in FIG. 7).

As the inorganic substrate 32, a quartz substrate, for example, is used. The thickness of the inorganic substrate 32 is, for example, 500 μm before the grinding/polishing process has not yet executed thereon.

2. Second Step of Temporarily Attaching Inorganic Substrate

Then, as shown in FIG. 8B, the inorganic substrate 34 made of an inorganic material having a birefringent property is temporarily attached to the base member 52 with a temporary bond D (step S112 in FIG. 7).

As the inorganic substrate 34, a quartz substrate, for example, is used. The thickness of the inorganic substrate 34 is, for example, 500 μm before the grinding/polishing process has not yet executed thereon. The base member 52, similarly to the base member 50, is a soda-lime glass plate with a predetermined thickness (e.g., 30 mm), and the surface of the base member 52 on which the inorganic substrate 34 is to be temporarily attached is finished like a frosted glass.

It should be noted that the second step of temporarily attaching the inorganic substrate may be executed prior to the first step of temporarily attaching the inorganic substrate.

3. Step of Grinding/Polishing the Inorganic Substrate

Then, as shown in FIG. 8C, the base member 50 with the inorganic substrate 32 temporarily attached thereto and the base member 52 with the inorganic substrate 34 temporarily attached thereto are mounted on a grinding/polishing device (not shown), and the inorganic substrates 32, 34 are ground and polished so as to have a predetermined thickness (e.g., 7 μm) (step S120 in FIG. 7).

In the step of grinding/polishing the inorganic substrate, it is arranged that the grinding/polishing of the inorganic substrates 32, 34 is terminated in the stage of grinding or rough polishing without performing mirror polishing.

After finishing the step of grinding/polishing the inorganic substrate, it is preferable that the ground/polished surface of each the inorganic substrates 32, 34 is wiped or cleansed with alcohol.

It should be noted that the grinding/polishing of the inorganic substrate 32 and the grinding/polishing of the inorganic substrate 34 may be executed at the same time as described above, or may be executed with separate timing.

4. First Step of Attaching Light Transmissive Support Substrate

Subsequently, as shown in FIG. 8E, the light transmissive support substrate 22 is attached to the surface of the ground/polished inorganic substrate 32 on the side opposite to the base member 50 with an adhesive C (step S130 in FIG. 7).

As the light transmissive support substrate 22, a quartz glass substrate, for example, is used. The thickness of the light transmissive support substrate 22 is, for example, 500 µm.

5. First Separation Step

Subsequently, as shown in FIG. 8F, the inorganic substrate 32 (i.e., the inorganic optical compensation plate 12) temporarily attached to the base member 50 is separated from the base member 50 together with the light transmissive support substrate 22 (step S140 in FIG. 7). The specific method of separation may be the same as the separation method previously explained in relation to other embodiments.

6. Second Step of Attaching Light Transmissive Support Substrate

Subsequently, as shown in FIG. 8G, the ground/polished inorganic substrate 34 and the light transmissive support substrate 22 with the inorganic substrate 32 attached thereto are bonded with each other with the adhesive C (step S150 in FIG. 7).

7. Second Separation Step

Subsequently, as shown in FIG. 8H, the inorganic substrate 34 (i.e., the inorganic optical compensation plate 14) temporarily attached to the base member 52 is separated from the base member 52 together with the inorganic substrate 32 (i.e., the inorganic optical compensation plate 12) and the light transmissive support substrate 22 (step S160 in FIG. 7). The specific method of separation may be the same as the separation method previously explained in relation to other embodiments.

By executing the discrete steps described above, the optical compensation element 2 (the optical compensation elements 460R, 460G, 460B) shown in FIG. 6 may be manufactured.

As described above, according to the method of manufacturing an optical compensation element related to at least one embodiment, since the inorganic substrates 32, 34 have once been ground and polished in the condition in which the inorganic substrates 32, 34 are temporarily attached to the base members 50, 52, then the ground/polished inorganic substrates 32, 34 and the light transmissive support substrate 22 are bonded with each other, and the inorganic substrates 32, 34 are separated from the base members 50, 52 together with the light transmissive support substrate 22, there is no need for handling each of the ground/polished inorganic substrates 32, 34 alone. As a result, the optical compensation element 2 having the inorganic optical compensation plates 12, 14 respectively disposed on both sides of the light transmissive support substrate 22 may more easily be manufactured than before.

Further, according to the method of manufacturing an optical compensation element related to at least one embodiment, since it is not required to handle each of the ground/polished inorganic substrates 32, 34 alone, the possibility of damaging the ground/polished inorganic substrates 32, 34 may be lowered, and as a result, reduction of manufacturing cost may be achieved.

Therefore, similarly to the method of manufacturing an optical compensation element according to at least one embodiment illustrated in FIGS. 1-4, the method of manufacturing an optical compensation element related to at least one embodiment as illustrated in FIGS. 5-8 becomes a manufacturing method of an optical compensation element capable of more easily manufacturing an optical compensation element than before, and achieving reduction of manufacturing cost.

Since the method of manufacturing an optical compensation element according to the at least one embodiment as illustrated in FIGS. 5-8 uses the same materials as the materials used in the method of manufacturing an optical compensation element according to the at least one embodiment illustrated in FIGS. 1-4, and executes the same steps as in the method of manufacturing an optical compensation element according to the previously described embodiment except the point that it is the manufacturing method of the optical compensation element having inorganic optical compensation plates respectively on both sides of the light transmissive support substrate, all of the corresponding advantages of the method of manufacturing an optical compensation element according to the at least one embodiment as illustrated in FIGS. 1-4 are directly applied to the method of manufacturing an optical compensation element according to the at least one embodiment as illustrated in FIGS. 5-8.

The projector 1002 according to at least one embodiment, such as the embodiment(s) illustrated in FIGS. 5-8, is provided with the optical compensation elements 460R, 460G, 460B manufactured by the manufacturing method of an optical compensation element according to the second embodiment, and consequently becomes a projector lower in price than before and capable of improving the contrast of the projection image.

Hereinabove, although the methods of manufacturing an optical compensation element and the projectors according to various embodiments are explained, the disclosure is not limited to the embodiments described above, but may be put into practice in various forms within the scope or the spirit of the disclosure, and the following modifications, for example, are also possible.

Although in each of the embodiments described above, the explanations are presented exemplifying the case in which the inorganic substrate and the light transmissive support substrate are bonded with each other with an adhesive as the step of attaching the light transmissive support substrate, the disclosure is not limited thereto, but the inorganic substrate and the light transmissive support substrate in various embodiments may be bonded with each other by direct bonding. As a variety of the direct bonding may be exemplified in various embodiments including, bonding with intermolecular force, plasma bonding, and so on.

Although in each of the embodiments described above, the quartz substrate is used as the inorganic substrate, the present disclosure is not limited thereto, but in an embodiment a sapphire substrate may be used. In various embodiments, an inorganic substrate made of other birefringent inorganic materials (e.g., wurtzite, rutile, sodium nitrate, tourmaline, cadmium sulfide) may also be used.

Although in each of the embodiments described above, the quartz glass substrate is used as the light transmissive support substrate, the disclosure is not limited thereto, but in various embodiments a substrate made, for example, of white crown glass, Pyrex (registered trademark) glass, crystallized glass, or sintered cubical crystal may also be used.

Although in each of the embodiments described above, a water-soluble temporary bond is used as the temporary bond, the disclosure is not limited thereto, but in various embodiments a heat-softening temporary bond (e.g., A-1579, a product of TESK Co., Ltd.) or wax may also be used.

Although in each of the embodiments described above, the explanations are presented exemplifying the case in which the light transmissive support substrate with substantially the same outer size as the outer size of the inorganic substrate is attached to the inorganic substrate, the disclosure is not limited thereto, but a light transmissive support substrate with larger outer size than the outer size of the inorganic substrate may be attached to the inorganic substrate. In this case, even if the adhesive flows off between the inorganic substrate and the light transmissive support substrate when bonding the inorganic substrate and the light transmissive support substrate with each other, the adhesive may be prevented from entering between the inorganic substrate and the base member or being attached to the base member, thus preventing the separation of the inorganic substrate from the base member from becoming difficult in the separation step.

Although in each of the embodiments described above, the base member having a surface finished like a frosted glass on the side on which the inorganic substrate is attached is used as the base member, the disclosure is not limited thereto. Another base member on which a predetermined process is executed so that the base member and the inorganic substrate are reliably fixed to each other with a temporary bond in the grinding/polishing process and are easily separated after the grinding/polishing process is finished may also be used.

Although in one embodiment, the explanations are presented exemplifying the case in which the optical compensation element is disposed each of the light-entrance and light-exit sides of the liquid crystal panel, the disclosure is not limited thereto. The number and the positions of the optical compensation elements may appropriately be changed in accordance with the type of the liquid crystal panel and so on.

Although in each of the embodiments described above, the liquid crystal panels and the optical compensation elements are disposed with distances, the disclosure is not limited thereto, but the liquid crystal panels and the optical compensation elements may be bonded with each other to use the optical compensation elements as substitutes for the dust-proof glass members to be provided to the liquid crystal panel.

In one embodiment, a rotational position adjustment device capable of adjusting a rotational position of each of the optical compensation elements 460R, 460G, 460B may further be provided. In this case, the optical compensation elements may be adjusted to have the optimum rotational positions, thus the contrast of a projection image may further be improved.

Although in each of the embodiments, the light source device formed of the ellipsoidal reflector is used as the light source device, the disclosure is not limited thereto, but a light source device formed of a paraboloidal reflector may also be used.

Although in each of the embodiments, the lens integrator optical system formed of the lens arrays is used as the light equalizing optical system, the disclosure is not limited thereto, but a rod integrator optical system formed of an integrator rod may also be used.

Although in each of the embodiments, the case in which the disclosure is applied to a so-called three-panel liquid crystal projector using the three liquid crystal light modulation devices is explained, the disclosure is not limited thereto, but may be applied to a projector using one, two, or more than three liquid crystal light modulation devices.

By executing the method of manufacturing an optical compensation element according to the disclosure, not only the optical compensation element used for a light transmissive liquid crystal light modulation device but also the optical compensation element used for a light reflective liquid crystal light modulation device may be manufactured.

The various embodiments of the disclosure may be applied to a front projection projector for performing projection from the side of observing the projection image, and also to a rear projection projector for performing projection from the side opposite to the side of observing the projection image.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

What is claimed is:

1. A method of manufacturing an optical compensation element, comprising:
    (a) temporarily attaching an inorganic substrate made of a birefringent inorganic material to a base member with a temporary bond;
    (b) grinding/polishing a surface of the inorganic substrate mounting the base member, to which the inorganic substrate is temporarily attached, on a grinding/polishing device;
    (c) attaching a light transmissive support substrate to the surface of the inorganic substrate thus ground/polished in step (b) on the opposite side to the side of the base member; and
    (d) separating the inorganic substrate temporarily attached to the base member from the base member such that the light transmissive support substrate remains attached to the surface of the inorganic substrate following separation of the inorganic substrate from the base member,
    wherein the steps (a), (b), (c), and (d) are executed in this order.

2. The method of manufacturing an optical compensation element according to claim 1, wherein the base member is a glass member having a surface finished like a frosted glass on a side to which the inorganic substrate is temporarily attached.

3. The method of manufacturing an optical compensation element according to claim 1, wherein in step (c), the inorganic substrate and the light transmissive support substrate are bonded with each other with an adhesive.

4. The method of manufacturing an optical compensation element according to claim 3, wherein in step (c), the light transmissive support substrate with a larger outer size than the outer size of the inorganic substrate is attached to the inorganic substrate.

5. The method of manufacturing an optical compensation element according to claim 1, wherein in step (c), the inorganic substrate and the light transmissive support substrate are bonded with each other with direct bonding.

6. The method of manufacturing an optical compensation element according to claim 1, wherein in step (b), the grinding/polishing of the inorganic substrate is terminated in a stage of one of grinding and rough polishing.

7. The method of manufacturing an optical compensation element according to claim 1, wherein one of a quartz substrate and a sapphire substrate is used as the inorganic substrate.

8. A projector comprising an optical compensation element manufactured by the method of manufacturing an optical compensation element according to claim 1.

9. A method of manufacturing a projector including a lighting device configured to generate a lighting beam; a color separation optical system configured to separate portions of the lighting beam received from the lighting device into colored light beams; at least one liquid crystal light modulation device configured to modulate the colored light beams in accordance with image information, the at least one liquid crystal light modulation device having an optical compensation element configured to improve contrast; a prism configured to combine the modulated colored light beams; and a projection optical system configured to project the combined modulated colored light beam, the method comprising:
- forming the optical compensation element of the at least one liquid crystal light modulation device by:
  - temporarily attaching an inorganic substrate made of a birefringent inorganic material to a base member with a temporary bond,
  - grinding/polishing a surface of the temporarily attached inorganic substrate on a grinding/polishing device,
  - attaching a light transmissive support substrate to the ground/polished surface of the inorganic substrate on the opposite side to the side of the temporarily attached base member, and
  - after attaching the light transmissive support substrate to the ground/polished surface of the inorganic substrate, separating the inorganic substrate temporarily attached to the base member from the base member to form the optical compensation element, the optical compensation element including the light transmissive support substrate attached to the surface of the inorganic substrate.

10. The method of manufacturing a projector as recited in claim 9, wherein the inorganic substrate of the optical compensation element is one of a quartz substrate and a sapphire substrate.

11. The method of manufacturing a projector as recited in claim 9, wherein the inorganic substrate of the optical compensation element is bonded to a light transmissive support substrate of the optical compensation element with an adhesive.

12. A method of manufacturing an optical compensation element, comprising:
- temporarily attaching an inorganic substrate made of a birefringent inorganic material to a base member with a temporary bond;
- grinding/polishing a surface of the inorganic substrate on a grinding/polishing device, the surface on the opposite side to the side of the inorganic substrate temporarily attached to the base member;
- attaching a light transmissive support substrate to the ground/polished surface of the inorganic substrate; and
- after attaching the light transmissive support substrate to the ground/polished surface of the inorganic substrate, separating the inorganic substrate temporarily attached to the base member from the base member such that the light transmissive support substrate remains attached to the surface of the inorganic substrate following separation of the inorganic substrate from the base member.

13. The method of manufacturing an optical compensation element according to claim 12, wherein the base member is a glass member having a surface finished like a frosted glass on a side to which the inorganic substrate is temporarily attached.

14. The method of manufacturing an optical compensation element according to claim 12, wherein the attaching the light transmissive support substrate includes bonding the inorganic substrate and the light transmissive support substrate with each other with an adhesive.

15. The method of manufacturing an optical compensation element according to claim 14, wherein the light transmissive support substrate includes a larger outer size than the outer size of the inorganic substrate to which the light transmissive support substrate is bonded.

16. The method of manufacturing an optical compensation element according to claim 12, wherein the attaching includes directly bonding the light transmissive support substrate to the ground/polished surface of the inorganic substrate.

17. The method of manufacturing an optical compensation element according to claim 12, wherein the grinding/polishing terminates in a state of rough polishing.

18. The method of manufacturing an optical compensation element according to claim 12, wherein the inorganic substrate is one of a quartz substrate and a sapphire substrate.

19. A projector comprising an optical compensation element manufactured by the method of manufacturing an optical compensation element according to claim 12.

* * * * *